United States Patent [19]
Körber et al.

[11] Patent Number: 5,463,550
[45] Date of Patent: Oct. 31, 1995

[54] DRIVING AND BRAKING CONTROL OF VEHICLES EQUIPPED WITH A PLURALITY OF SINGLE WHEEL DRIVE AND BRAKE MODULES

[75] Inventors: Joachim Körber, Weinheim; Klaus Niemann, Welzheim; Fritz Frederich, Krefeld; Christian Günther, Haar, all of Germany

[73] Assignee: AEG Westinghouse Transport-Systeme GmbH, Berlin, Germany

[21] Appl. No.: 964,637

[22] Filed: Oct. 23, 1992

[30] Foreign Application Priority Data

Oct. 25, 1991 [DE] Germany .................. 41 35 691.8

[51] Int. Cl.[6] ............................................. B60T 15/60
[52] U.S. Cl. ............................................. 364/426.01
[58] Field of Search .................. 364/426.07; 318/51, 318/52, 55, 56, 66, 67, 71, 77, 138, 139, 270, 113, 799; 388/814

[56] References Cited

U.S. PATENT DOCUMENTS

| | | | |
|---|---|---|---|
| 3,210,630 | 10/1965 | Zelina | 318/52 |
| 3,437,896 | 4/1969 | Hoge | 318/52 |
| 3,482,887 | 12/1969 | Sheppard | 303/21 |
| 3,541,406 | 11/1970 | Etienne | 318/52 |
| 3,728,596 | 4/1973 | Hermansson et al. | 318/52 |
| 3,982,164 | 9/1976 | de Buhr et al. | 318/52 |
| 4,035,698 | 7/1977 | Söderberg | 318/52 |
| 4,075,538 | 2/1978 | Plunkett | 318/52 |
| 4,463,289 | 7/1984 | Young | 318/52 |
| 4,588,932 | 5/1986 | Riondel | 318/52 |
| 4,896,090 | 1/1990 | Balch et al. | 318/52 |
| 5,136,218 | 8/1992 | Pessina | 318/139 |
| 5,163,170 | 11/1992 | Grabowski | 318/113 |
| 5,289,100 | 2/1994 | Joseph | 318/799 |

FOREIGN PATENT DOCUMENTS

| | | |
|---|---|---|
| 0080139 | 11/1982 | Germany . |
| 57-162903 | 10/1982 | Japan . |
| 59-136004 | 12/1984 | Japan . |
| 671377 | 1/1986 | Switzerland . |

OTHER PUBLICATIONS

Volkening, "Die neue vöv–Niederflur–Stadtbahn," Stadtbahn, Nahverkehrs Praxis; three pages.

Primary Examiner—Kevin J. Teska
Assistant Examiner—Stephen J. Walder, Jr.
Attorney, Agent, or Firm—Spencer, Frank & Schneider

[57] ABSTRACT

Regulation of the driving and braking of vehicles equipped with a plurality of single wheel drive and brake unit modules, controlled by control processing circuitry, that act on the guiding function of the wheels includes coupling in pairs control processing circuitry associated with the individual single wheel drive and brake unit modules, the pairs of modules being symmetrically disposed with respect to a plane of the vehicle. The degree of coupling is dynamically changed.

4 Claims, 4 Drawing Sheets

DRIVING AND BRAKING CONTROL OF VEHICLES EQUIPPED WITH A PLURALITY OF SINGLE WHEEL DRIVE AND BRAKE MODULES

CROSS-REFERENCE TO RELATED APPLICATION

This application claims the priority of Application Serial Number P 4135691.8, filed Oct. 25th, 1991, in Germany, the subject matter of which is incorporated herein by reference.

BACKGROUND OF THE INVENTION

1. Field of the Invention

The present invention relates to a method and arrangement for regulating the driving and braking of vehicles equipped with a plurality of single wheel drive and brake unit modules which act on the guiding function of the wheels.

2. Background Information

In the past, driving and braking systems have been accommodated either centrally in an individual vehicle from where they acted on sets of wheels by way of associated drive and brake units, or—particularly in connection with railroads— these systems were arranged exclusively in special driving vehicles, such as locomotives or driving units. The configuration and the range of use of the vehicles was thus substantially dependent on the driving and braking arrangement employed.

Vehicles equipped with single wheel drives are known per se. In these vehicles, elimination of the axles normally connecting the wheels permits the vehicle chassis to be lowered to a minimum clearance and opens up new possibilities for configuring passenger regions in the vehicle.

The use of single wheel drives with integrated brake units is disclosed, for example, in "Nahverkehrspraxis" (translation: "Commuter Traffic in Practice") No. 5, 1991, pages 171–173. Because of the compact configuration, further possibilities for improvement in the vehicle configuration can be realized. Such single wheel drive and brake units are also called EAB modules, the EAB standing for the German Einzelrad-Antriebs- und Bremseinheiten. They exhibit the characteristic that the driving and braking functions interfere with, indirectly or directly, the guiding function of the wheel. This guiding function requires matched behavior of the individual single wheel drive and brake unit modules.

In addition, with respect to power, the systems known today are coupled mechanically and/or electrically. Thus, it is possible that some negative influence on the guiding behavior of the wheel may be encountered in the known systems.

SUMMARY OF THE INVENTION

It is an object of the present invention to develop novel methods and arrangements for controlling vehicles equipped with single wheel drive and brake unit modules which, in addition to achieving optimum utilization of friction lock and avoiding slip/stick effects, exclude negative influences on the guiding characteristics of these single wheel drive and brake unit modules and, in fact, are also able to improve the guiding action.

This is accomplished according to an embodiment of the invention by a method of regulating driving and braking of vehicles equipped with a plurality of single wheel drive and brake unit modules, the driving and braking affecting guiding functions of wheels associated with the modules, comprising: coupling in pairs control processing associated with respective individual single wheel drive and brake unit modules, the pairs of individual single wheel drive and brake unit modules so coupled being symmetrically disposed with respect to a plane of the vehicle; and dynamically changing the degree of coupling of the control processing.

Advantageously, according to a further embodiment of the invention, respective single wheel drive and brake unit modules assigned to a left wheel and a right wheel form a pair. In a further embodiment, each individual module has a respective torque control circuit, the respective control processing including determining respective estimated actual torque values at the associated wheel from circumferential forces, and wherein the coupling comprises: receiving in a first minimum value determining stage, respective right and left estimated actual torque values, forming a minimum value therefrom, and outputting a corresponding permissible torque value; and subsequently forming, in a second minimum value determining stage, a common minimum set, i.e., desired, torque value for the left and right torque control circuits, and, if there are extraneous lateral forces, producing corresponding additional set torque values which are combined with the common minimum set torque value for the respective left and right torque control circuits with different signs to thereby remove interference and to generate guiding forces which are produced by transverse slip of the wheels to counteract the lateral forces at the points where the wheels contact the traveling surface.

Advantageously, according to a further embodiment of the invention, respective single wheel drive and brake unit modules assigned to a left wheel and a right wheel form a pair, each individual module has its own slip control circuit, at least one speed sensor is provided to determine the actual speed of the vehicle, and the coupling comprises: receiving a signal representing the actual speed from the at least one speed sensor and forming respective set wheel circumference speed signals with respective computers associated with respective single wheel drive and brake units; receiving the respective set wheel circumference speed signals from the respective computers and forming at least one minimum value with at least one minimum value determining stage; and providing at least one minimum value to the respective slip control circuits by way of comparison stages and, if there are extraneous lateral or line layout forces, generating respective additional set circumferential speed values with different signs and combining them with the at least one minimum value in the respective comparison stages to thereby remove interference and generate guiding forces to produce a respective transverse slip of the wheels to counteract lateral forces at points where the wheels contact a traveling surface.

Advantageously, according to a further embodiment of the invention, the at least one speed sensor comprises a separate speed sensor for each slip control circuit, a respective speed sensor feeding a respective computer, and the at least one minimum value determining stage comprises a separate minimum value determining stage for each slip control circuit.

Advantageously, according to a further embodiment of the invention, the speed sensors comprise respective estimating members for estimating traveling speed over the ground, with the respective estimating members determining, under consideration of line layout influences, values for the left and right single wheel drive and brake units from a known traveling speed of the vehicle.

Further advantages and features of the invention will become apparent from the detailed description taken with the figures.

BRIEF DESCRIPTION OF THE DRAWINGS

The invention will now be described in greater detail with reference to schematically illustrated embodiments thereof in which.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not be construed as limiting the inventive concept to any particular physical configuration.

Figure 1:
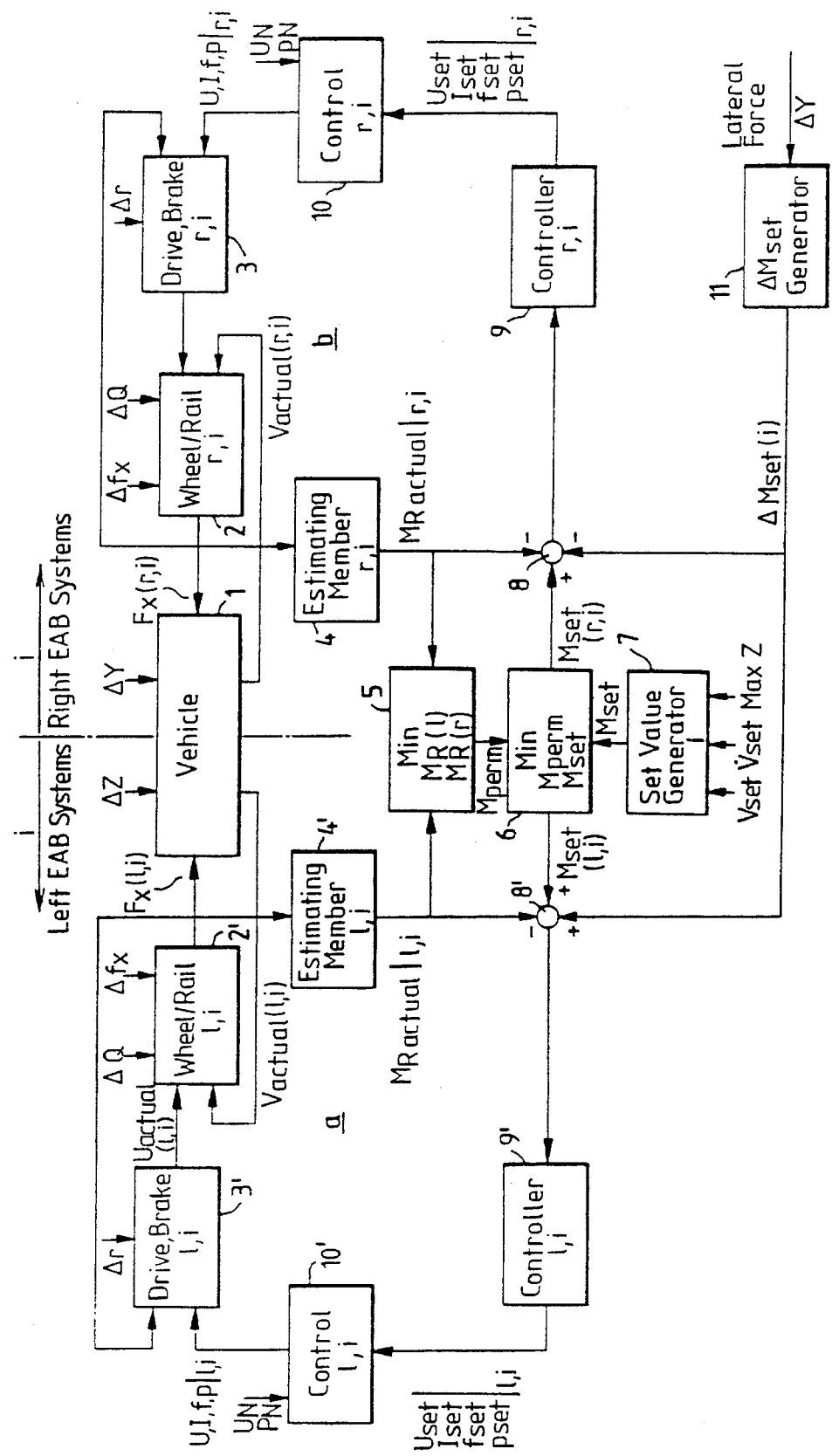
FIG. 1 is a circuit block diagram for the torque regulation of a pair of single wheel drive and brake unit modules.

FIG. 1 shows a block representing vehicle dynamics 1 with wheels/rails contact dynamics 2, 2', drive and brake dynamics 3, 3' and the interconnection of control processing circuitry (a, b) for one of a plurality of single wheel drive and brake unit module pairs, denoted by the subscript i. Before proceeding further with the discussion of FIG. 1, the following table is presented as an aid in understanding the symbols used in the figures.

| SYMBOLS USED | |
| --- | --- |
| f | frequency for drive |
| $f_x$ | longitudinal locking force |
| $\Delta f_x$ | change in longitudinal locking force |
| $f_y$ | transverse locking force |
| t | current |
| M | drive and brake moment of torsion (torque) |
| $\Delta M$ | Change in drive and brake torque |
| M(R) | force of wheel circumference |
| p | brake cylinder pressure |
| $\Delta Q$ | change in force of wheel |
| $\Delta r$ | change in wheel radius |
| u | speed of wheel circumference |
| $\Delta u$ | change in speed of wheel circumference |
| U | electrical voltage |
| v | driving speed |
| $\dot{v}$ | acceleration and deceleration of vehicle |
| $\Delta Y$ | transverse change |
| Z | tensive (tractive) force on wheel |
| $\Delta Z$ | change in tensive force |

| MEANING OF INDEXES | |
| --- | --- |
| i | index of individual pair of wheel |
| act | actual value |
| l | left |
| r | right |
| N | nominal value |
| set | set (target, desired, reference) value |
| perm | permissible value |

Forces acting on vehicle 1 include changing lateral forces due to, for example, line layout and aerodynamics, denoted as $\Delta Y$, and changing forces due to tractive power denoted as $\Delta Z$. Each module pair includes a left wheel 2' and a right wheel 2 as well as an associated driving and braking system 3' and 3, respectively. Various control signals are provided to the module pairs as shown, and they are subject to physical properties, such as wheel and brake friction. Only those forces and control signals necessary for an understanding of the invention will be discussed in detail in the interests of economy.

In an embodiment of a method and arrangement for regulating the module pairs to control the respective torques according to the invention, separate estimating members 4' and 4 produce estimated actual torque values representative of the actually existing circumferential forces based on signals $F_x(l,i)$ and $F_x(r,i)$ from the wheels/rails 2', 2. Since longitudinal wheel contact forces, e.g., slip forces, are not directly measurable, they must be estimated from the known driving/braking moment (torque) divided by the average wheel radius, i.e., M(R)actual.

The estimated actual torque values from estimating members 4' and 4 are fed to a first minimum value determination stage 5 which determines the minimum of the values, and taking into account wheel diameters, outputs a permissible torque $M_{perm}$ which is fed to a second minimum value determining stage 6.

Second minimum value determining stage 6 produces identical left and right set torque values $M_{set}(l,i)$, $M_{set}(r,i)$ by determining a minimum value formed from the permissible torque $M_{perm}$ and a set torque value $M_{set}$, produced in a set value generator 7 based on a given speed $v_{set}$, a given acceleration $\dot{v}_{set}$ and a given maximum permissible tractive power Max Z of the traction unit coming from the vehicle control as input, respectively. The determination is made by using all values that are given, with one being able to dominate. "Set" as used herein refers to a desired, target or reference value, i.e., a set value that must be attained.

These identical set torque values $M_{set}(l,i)$, $M_{set}(r,i)$ are fed to comparison stages 8' and 8, respectively, for the left and right control processing circuitry (a, b) of the torque control system for the single wheel drive and brake unit modules.

The differences at comparison stages 8' and 8 between the respective estimated actual torque values output by estimating members 4' and 4, and the respective set torque values $M_{set}(l,i)$ and $M_{set}(r,i)$, are fed to the controllers 9' and 9, respectively, of the separate control processing circuitry (a, b). Controllers 9, 9' are conventional drive and brake controllers for the drive and brake systems of the individual wheel units and function in a known manner. Control processing circuitry (a, b), by way of adjustment members (blocks labelled Control) 10' and 10, influences the drive and brake systems 3' and 3 of the respective modules.

The control processing circuitry (a, b) controls the right and left single wheel drive and brake unit modules in such a way that all are regulated to the same minimum torque (electrical differential). Thus, in the arrangement according to the invention, there will no longer exist the problem of interference in the guiding function of the single wheel drive and brake unit module pairs.

The drive and brake systems operate within a slip limit. However, in order to be able to react to extraneous lateral forces $\Delta Y$ (line layout and aerodynamic forces), a $\Delta M$ set value generator 11 predetermines additional torques $\Delta M_{set}$ which are fed, with suitably reversed signs, to comparison stages 8' and 8. From the measured value of the lateral force and the resulting available contact points, the set value generators can determine the change in moment $\Delta M_{set}$. The result is a controlled torque difference between right and left that leads to a controlled transverse slip of the two single wheel drive and brake unit modules and wheels. At the points of contact between the wheel and the traveling surface, transverse forces directed against the extraneous lateral forces ΔY are generated. Thus, the single wheel drive and brake unit modules are also able to react, within predetermined track deviations, to external transverse forces and thus perform an enhanced guiding function.

The degree of coupling of the controlled single wheel drive and brake unit modules can be adjusted by way of estimating members 4' and 4 and controllers 9' and 9 and can be dynamically adapted to the various requirements during use.

Figure 2:
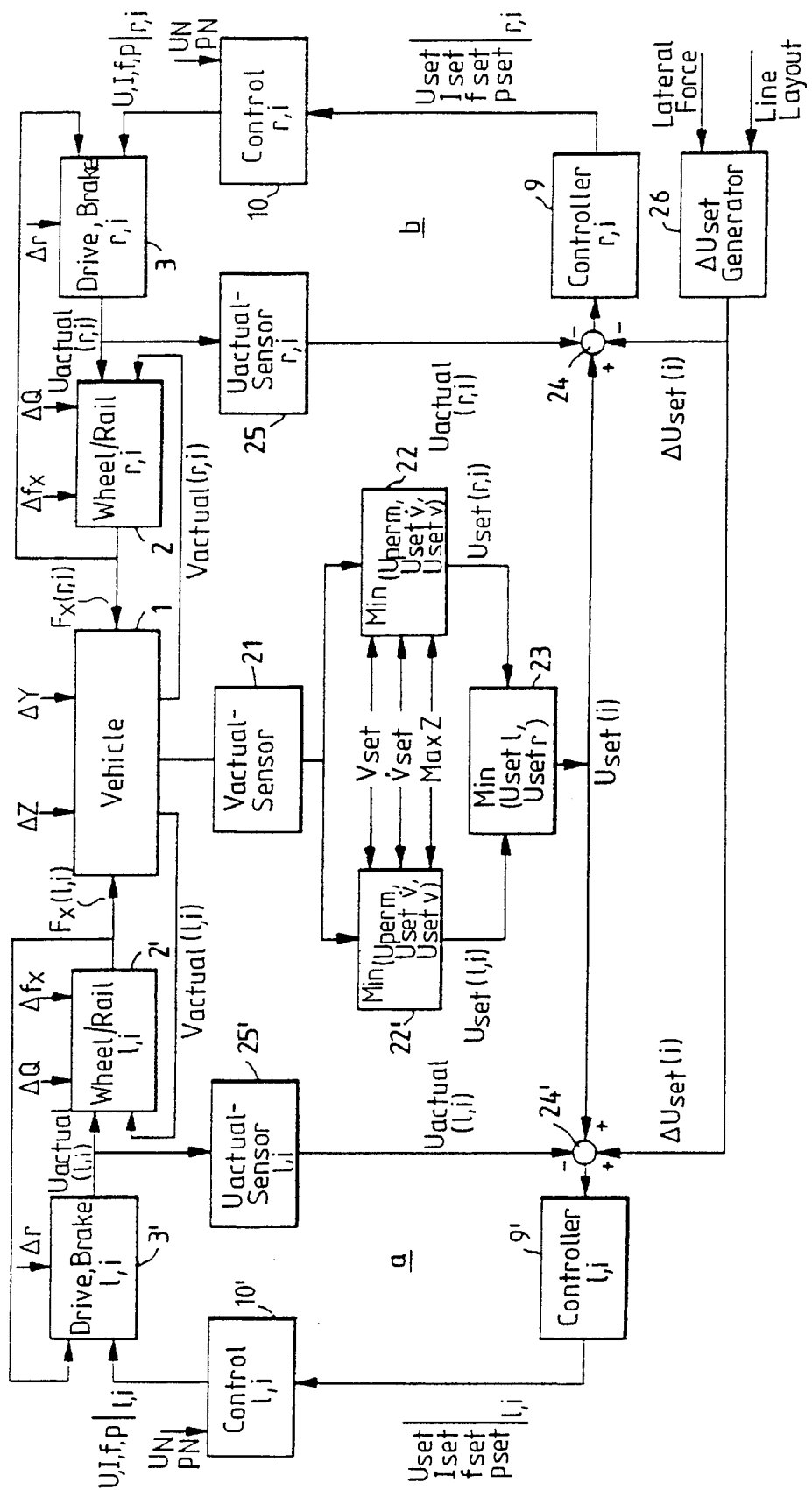
FIGS. 2, 3 and 4 are circuit block diagrams for the various slip control concepts for pairs of single wheel drive and brake unit modules.

FIG. 2 depicts a process control coupling for purposes of controlling the two single wheel drive and brake unit systems in a slip control method according to another embodiment of the invention in which the circumferential speeds of the left wheel 2' and of the right wheel 2 are regulated. Insofar as is justifiable from a substantive aspect, the reference numerals remain unchanged as compared to FIG. 1.

According to the FIG. 2 embodiment, the wheel circumference speeds $U_{set}$ for both control systems a and b are determined separately for each control system a and b from the actual speed $v_{actual}$ of vehicle 1 detected by means of an individual speed sensor 21, in a computer 22' (for control circuit a) and a computer 22 (for control circuit b) with the aid of parameters, such as speed $v_{set}$, acceleration $\dot{v}_{set}$, and maximum tractive power Max Z given, for example, of a train. These circumferential speeds do not exceed the slip limit on either side.

The minimum of the two values is determined by means of minimum value stage 23 and becomes the identical set value $U_{set}$ for the circumferential speed of the wheels of the two single wheel drive and brake unit systems. In comparison stages 24' and 24, $U_{set}$ is compared with the actual wheel circumference speed $U_{actual}$ measured by further sensors 25' and 25. The resulting difference signal is then processed in controllers 9' and 9 and converted to actuation signals which influence the wheel circumference speed in such a way that microslip differences required to generate the acceleration or deceleration forces are maintained precisely.

Line layout and/or aerodynamically caused lateral forces ΔY are—as already described similarly in connection with FIG. 1—converted in a special generator 26 into an additional given set circumferential speed value $\Delta U_{set}$ which is fed to the right and left single wheel drive and brake unit system with opposite signs. Thus, a controlled circumferential speed difference is introduced between the right single wheel drive and brake unit module and the left single wheel drive and brake unit module. This results in a torque about the elevation axis of the vehicle, thus generating a transverse slip at points of contact between the wheel and its traveling surface in such a way that extraneous transverse forces are neutralized.

The coupling for regulating purposes is here effected by way of computers 22' and 22 and controllers 9' and 9, and the degree of coupling can therefore be modified by means of software.

Figure 3:
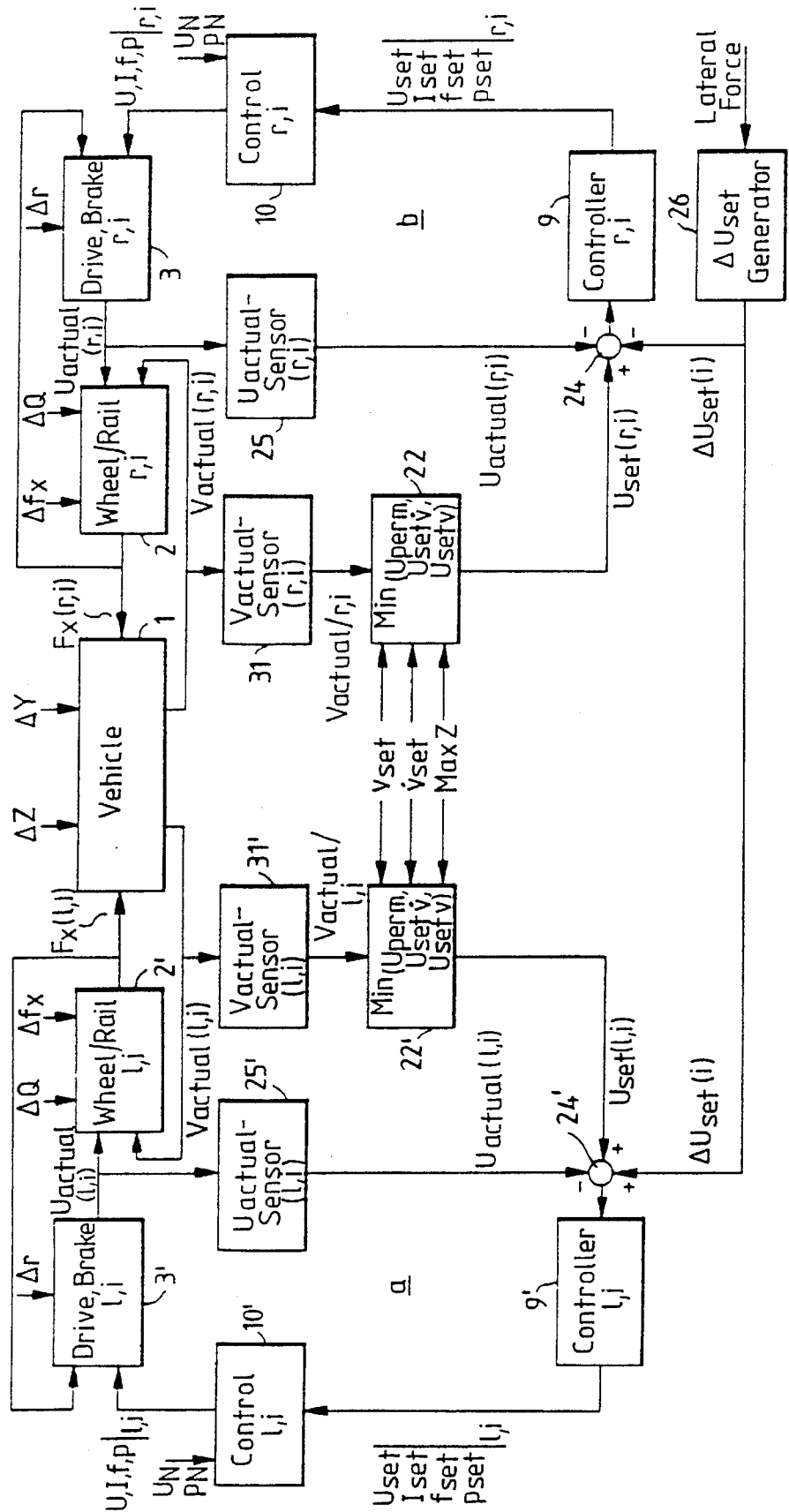

FIG. 3 shows a variation according to a further embodiment of the slip control method of FIG. 2. Here set values for circumferential speed $U_{set}$ are determined separately for the left and right single wheel drive and brake unit systems by way of computers 22' and 22. In order not to exceed the slip limits, a separate minimum value determination is made for the left side and the right side by utilizing given values such as, for example in a train, the speed $v_{set}$, acceleration $\dot{v}_{set}$ and maximum tractive power Max Z. Separate sensors 31' and 31 are employed on the left and the right (for example by way of left and right running wheels) for a precise determination of the speed of vehicle 1 over the ground. Otherwise, the circuit block diagram corresponds to that of FIG. 2 with corresponding reference numerals.

Thus, in order to react to extraneous lateral forces, it is only necessary to convert the forces generated by aerodynamics into an additional set wheel circumference speed value. This is done by generating and adding in a corresponding additional wheel circumference speed value $\Delta U_{set}$ (in this connection see also FIG. 1 or 2).

Figure 4:
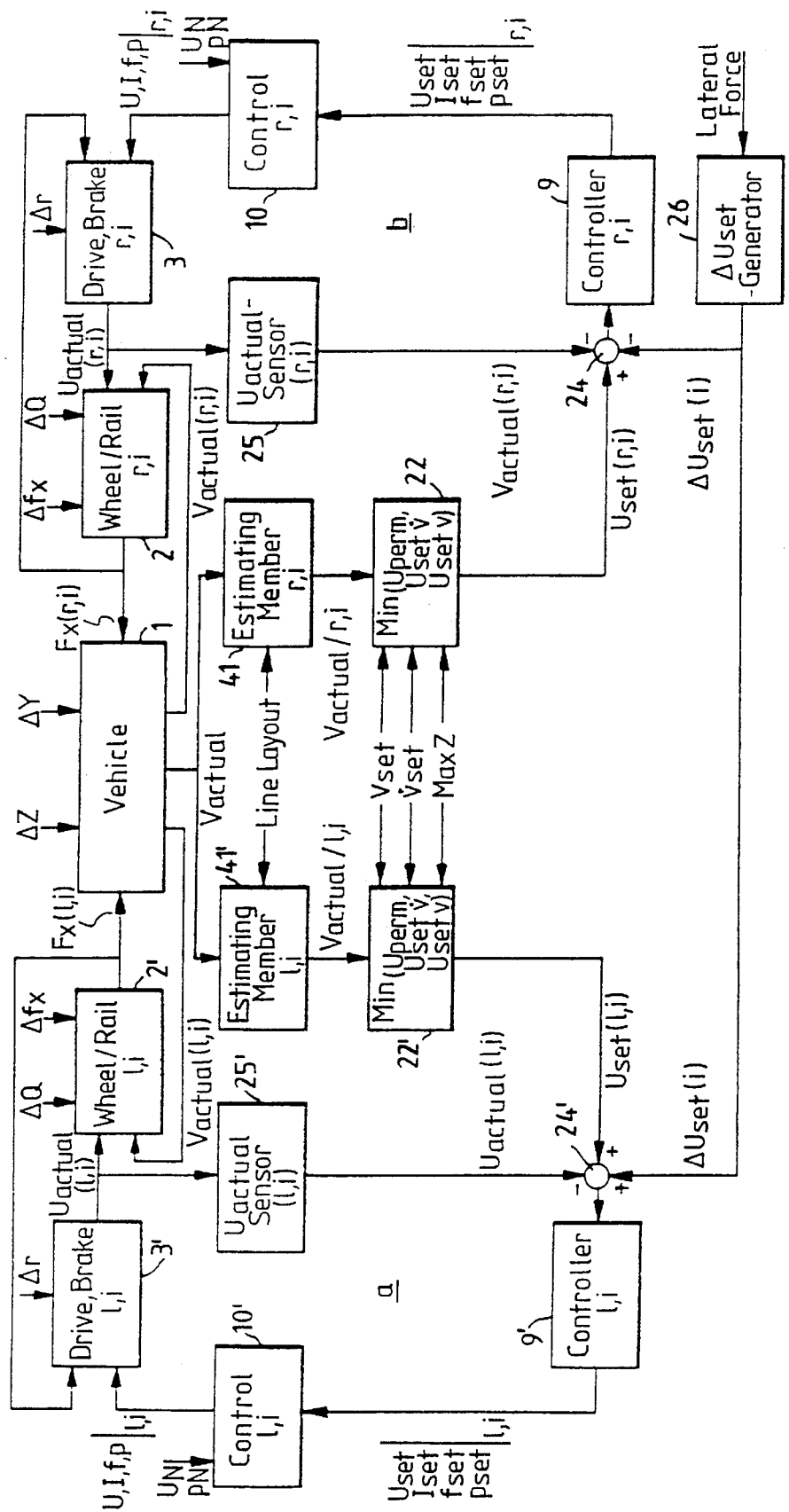

FIG. 4 shows a further variation of the slip control method according to the invention in which, instead of actual speed sensors 31', 31 in FIG. 3, estimating members 41', 41 are now employed for the determination of the vehicle ground speed for the left and right single wheel drive and brake unit systems. This is to determine, under consideration of the line layout influences, the relevant values for the right single wheel drive and brake unit system and the left single wheel drive and brake unit system, respectively, from the known vehicle speed. The further operation of the system is the same as that of the system of FIG. 3.

By slightly modifying the arrangement, the present invention permits configuration of the system to place the minimum requirements for free space on a vehicle thereby allowing the vehicle to be designed primarily according to passenger considerations. The same configurations of the invention of single wheel drive and brake unit modules can be employed for railroad vehicles and buses alike. Flexibility in the use of the vehicles, with respect to speed of response or installed power, is realized by coupling the control of the single wheel drive and brake unit modules together according to the invention. Control variations are readily effected by application software changes, as would be readily apparent to one of ordinary skill in the art.

It will be apparent to one of ordinary skill in the art that the manner of making and using the claimed invention has been adequately disclosed in the above-written description of the preferred embodiments taken together with the drawings.

It will be understood that the above description of the preferred embodiments of the present invention is susceptible to various modifications, changes, and adaptations, and the same are intended to be comprehended within the meaning and range of equivalents of the appended claims.

What is claimed is:

1. An apparatus for regulating driving and braking of vehicles having right and left wheels, the apparatus comprising:

at least two single wheel drive and brake unit modules each respectively associated with the respective right and left wheels and each being symmetrically disposed with respect to a plane of the vehicle to form a respective pair of individual single wheel drive and brake unit modules, the modules regulating the driving and braking of the vehicle to affect a guiding function of the respective wheels;

first generator means for generating a set torque value;

at least two torque control processing circuits each being respectively associated with and controlling a respective one of the at least two single wheel drive and brake unit modules, and each including changing means for dynamically changing a degree of coupling of the torque control processing circuits, the changing means comprising means for determining respective estimated actual torque values at the associated wheel from circumferential forces;

coupling means for coupling in pairs the torque control processing circuits, and comprising:

a first minimum value determination stage means for receiving respective right and left wheel estimated actual torque values, forming a minimum value therefrom, and outputting a corresponding permissible torque value; and a second minimum value determination stage means, for subsequently forming a common minimum set torque value for the respective torque control processing circuits from the permissible torque value and the set torque value;

second generator means for generating respective additional set torque values each with different signs for each torque control processing circuit, representative of any extraneous lateral forces; and combining means for receiving and combining the respective additional set torque values with the respective common minimum set torque value for the respective left and right torque control processing circuits for producing a controlled transverse slip of the wheels and creating the guiding force to counteract the lateral forces at a point where the wheels contact a traveling surface.

2. An apparatus for regulating driving and braking of vehicles having right and left wheels, the apparatus comprising:

a common speed sensor for determining an actual speed of the vehicle;

at least two single wheel drive and brake unit modules each respectively associated with the respective right and left wheels and each being symmetrically disposed with respect to a plane of the vehicle and coupled together to form a respective pair of individual single wheel drive and brake unit modules, the modules regulating the driving and braking of the vehicle to affect a guiding function of the respective wheels;

at least two slip control processing circuits each being respectively associated with and controlling a respective one of the at least two single wheel drive and brake unit modules;

coupling means for coupling the slip control processing circuits together wherein a degree of coupling is dynamically changeable, comprising a respective processing means associated with each respective slip control processing circuit and each being operatively connected to the common speed sensor for receiving a signal representing the actual speed from the speed sensor and generating a respective set wheel circumferential speed signal;

a minimum value determination stage means for receiving the respective set wheel circumferential speed signal and forming a minimum set wheel circumferential speed value therefrom;

generator means for generating respective additional set wheel circumferential speed signals each with different signs for each slip control processing circuit, representative of any extraneous lateral forces and line layout forces; and combining means for receiving and combining the respective additional set wheel circumferential speed signals with a further signal representing the actual speed of the vehicle and with the respective minimum set wheel circumferential speed value for the respective left and right slip control processing circuits for producing a controlled transverse slip of the wheels and creating the guiding force to counteract the lateral forces and line layout forces at a point where the wheels contact a traveling surface.

3. An apparatus for regulating driving and braking of vehicles having right and left wheels, the apparatus comprising:

a plurality of speed sensors for determining an actual speed of the vehicle;

at least two single wheel drive and brake unit modules each respectively associated with the respective right and left wheels and each being symmetrically disposed with respect to a plane of the vehicle and coupled together to form a respective pair of individual single wheel drive and brake unit modules, the modules regulating the driving and braking of the vehicle to affect a guiding function of the respective wheels;

at least two slip control processing circuits each being respectively associated with and controlling a respective one of the at least two single wheel drive and brake unit modules;

coupling means for coupling the slip control processing circuits together wherein a degree of coupling is dynamically changeable, comprising a respective processing means associated with each respective slip control processing circuit each being operatively connected to a respective speed sensor for receiving a signal representing the actual speed from the respective speed sensor and generating a respective set wheel circumferential speed signal;

generator means for generating respective additional set wheel circumferential speed signals each with different signs for each slip control processing circuit, representative of any extraneous lateral forces and line layout forces; and combining means for directly receiving the respective set wheel circumferential speed signals and combining the respective set wheel circumferential speed signals with respective additional set wheel circumferential speed signals and with a further signal representing the actual speed of the vehicle for producing a controlled transverse slip of the wheels to counteract the lateral forces and line layout forces at a point where the wheels contact a traveling surface.

4. An apparatus for regulating driving and braking of vehicles having right and left wheels, the apparatus comprising:

at least two single wheel drive and brake unit modules each respectively associated with the respective right and left wheels and each being symmetrically disposed with respect to a plane of the vehicle and coupled together to form a respective pair of individual single wheel drive and brake unit modules, the modules regulating the driving and braking of the vehicle to affect a guiding function of the respective wheels;

a plurality of estimating means for determining respective estimated actual speed values of the vehicle and each generating a signal for the right and left wheel drive and brake unit modules representative of line layout influences and a known traveling speed of the vehicle;

at least two slip control processing circuits each being respectively associated with and controlling a respective one of the at least two single wheel drive and brake unit modules;

coupling means for coupling the slip control processing circuits together wherein a degree of coupling is dynamically changeable, comprising a respective processing means associated with each respective slip control processing circuit, each respective processing means being operatively connected to a respective estimating means for receiving the signal from the respective estimating means and generating a respective set wheel circumferential speed signal;

generator means for generating respective additional set wheel circumferential speed signals each with different signs for each slip control processing circuit, representative of any extraneous lateral forces and line layout forces; and combining means for directly receiving the respective set wheel circumferential speed signals and combining the respective set wheel circumferential speed signals with respective additional set wheel circumferential speed signals and with a further signal representing the actual speed of the vehicle for producing a controlled transverse slip of the wheels to counteract the lateral forces and line layout forces at a point where the wheels contact a traveling surface.

* * * * *